Figure 1:
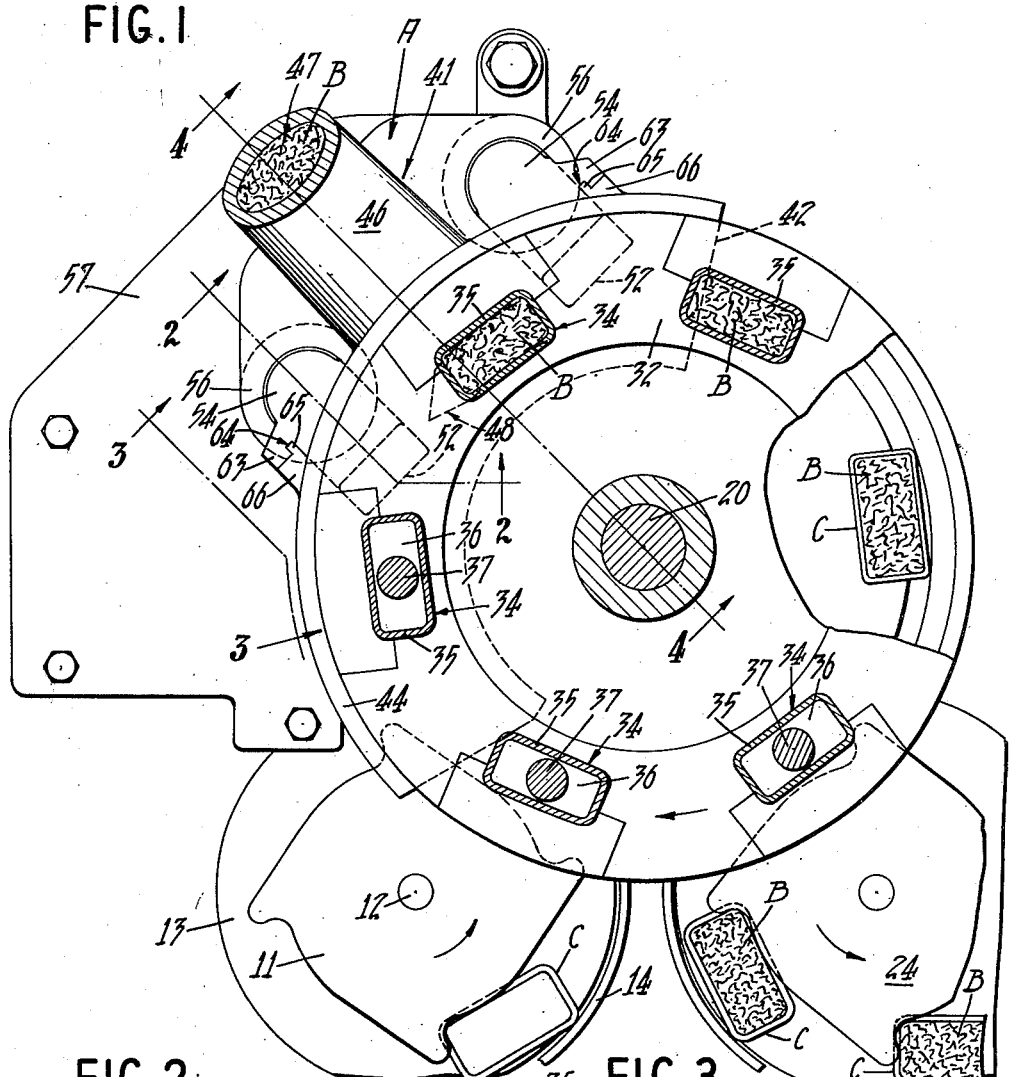

Nov. 27, 1956 W. PECHY 2,771,916
CAN FILLING MACHINE WITH REMOVABLE MANIFOLD MECHANISM
Filed Dec. 21, 1953 2 Sheets-Sheet 1

INVENTOR.
WILLIAM PECHY
BY Charles H. Ernst
Leland R. McCann
George W. Reiber
ATTORNEYS Nov. 27, 1956 W. PECHY 2,771,916
CAN FILLING MACHINE WITH REMOVABLE MANIFOLD MECHANISM
Filed Dec. 21, 1953 2 Sheets-Sheet 2

INVENTOR.
WILLIAM PECHY
BY *Charles H. Erne*
*Leland R. McCann*
*George W. Reifer*
ATTORNEYS United States Patent Office 2,771,916
Patented Nov. 27, 1956

2,771,916

CAN FILLING MACHINE WITH REMOVABLE MANIFOLD MECHANISM

William Pechy, Belmar, N. J., assignor to American Can Company, New York, N. Y., a corporation of New Jersey Application December 21, 1953, Serial No. 399,393

6 Claims. (Cl. 141—150)

The present invention relates to filling machines for packing meat products and the like into cans or containers and has particular reference to a removable manifold mechanism for introducing the product to be packed, into the machines.

In machines for packing meat products into cans or containers, the product usually is introduced into a mold or carrier and the mold inserted into a container and gradually withdrawn as the product is forced out of the mold into the can. This leaves the product in the can in a compact mass that fills the can without the entrapment of air. The molds usually are parts of filling heads which are movable into position to pick up a supply of the product and to subsequently follow the path of travel of a can to transfer the product thereto.

Introduction of the meat product into the molds or carriers usually is effected by a hollow stationary manifold over which the filling heads frictionally slide in succession. Due to the solid nature of the meat product, considerable pressure on the product is required to force the product through the manifold and into the filling heads. In some cases the pressure required on the product is so great as to cause some of the product to leak out between the frictionally and abuttingly engaged manifold and mold during the mold filling operation. This results in unsanitary conditions in the machine as well as considerable loss of the product.

An object of the instant invention is the provision in a machine for filling meat products and the like into containers, of a manifold mechanism for introducing a product under pressure into a moving filling head wherein the manifold is self-aligning against the filling head and is held by pressure against the head to provide a substantially airtight fit between the manifold and the moving head and to thereby prevent leakage of the product during introduction of the product into the filling head.

Another object is the provision of such a manifold mechanism wherein the manifold is freely mounted so that it can be readily removed from the machine to facilitate proper cleaning of the product passages and thereby enhance sanitary conditions in the machine.

Another object is the provision of such a manifold mechanism wherein the pressure on the manifold to hold it in place against the filling head may be readily controlled so that only sufficient pressure to prevent leakage of the product may be obtained without causing undue frictional engagement resulting in undue wear and objectionable drag between and on the manifold and the filling heads.

Numerous other objects and advantages of the invention will be apparent as it is better understood from the following description, which, taken in connection with the accompanying drawings, discloses a preferred embodiment thereof.

Figure 2:
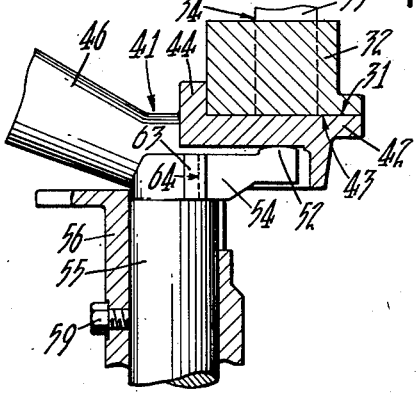
Figure 3:
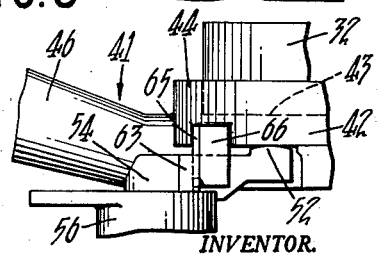
Figure 4:
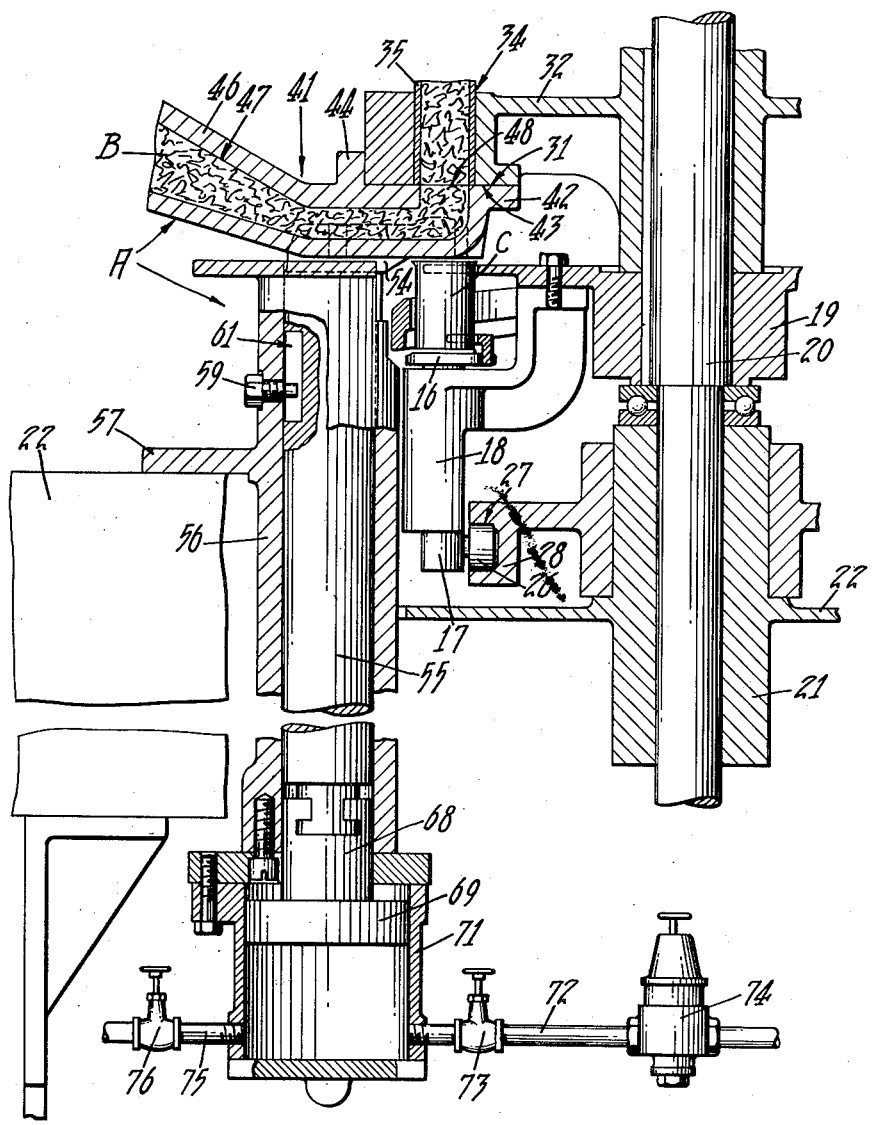

Referring to the drawings:

Figure 1 is a top plan sectional view of a can filling machine embodying the instant invention, with parts broken away; and Figs. 2, 3 and 4 are sectional views taken substantially along the lines 2—2, 3—3, 4—4, in Fig. 1, parts being broken away in each view.

As a preferred or exemplary embodiment of the instant invention the drawings illustrate a manifold mechanism A (Figs. 1 and 4) for introducing meat products B into a can or container filling machine of the character disclosed in United States Patent 2,336,415, issued December 7, 1943, to Ronald E. J. Nordquist et al. on Can Filling Machine.

In such a machine the meat product B is filled into open top cans C (Figs. 1 and 4) moving through the machine in spaced and timed order. The cans C are received from any suitable source of supply and are advanced into the machine by a star wheel 11 (Fig. 1) mounted on and rotated by a shaft 12 as disclosed in the above mentioned Nordquist patent. The cans are supported in an upright position on a disc-shaped table 13 having a partially surrounding guide rail 14 to guide the cans in the filling machine.

The star wheel 11 positions the cans C individually onto lifter pads 16 (Fig. 4) having depending stems 17 carried in bearing brackets 18 secured to a flanged hub 19 keyed to a vertical shaft 20 journaled in a bearing 21 in a frame 22 which constitutes the main frame of the machine. The shaft 20 is rotated in any suitable manner as disclosed in the above mentioned Nordquist patent. There are a plurality of the lifter pads 16 corresponding with the number of filling heads and they are carried around a circular path of travel by the rotation of the shaft 20, to advance the cans through the machine for the filling operation and to carry the filled cans into a rotatable discharge wheel 24 which discharges them to any suitable place of deposit.

During their travel through the machine, the cans C are lifted vertically by their lifter pads 16 for the filling operation. This vertical movement of the lifter pads 16 is brought about by cam rollers 26 (Fig. 4) which are carried on the lower ends of the stems 17 and which operate in a cam groove 27 of a stationary cam 28 secured to and surrounding the hub 21 of the shaft 20.

Lifting of the cans C for the filling operation positions the open top ends of the cans into engagement with a smooth horizontal bottom face 31 (Fig. 4) of a turret 32 which is keyed to and rotates with the shaft 20. The turret 32 carries a plurality of filling heads 34 which are disposed one above and in vertical alignment with each of the lifter pads 16. The filling heads 34 comprise product measuring sleeves, carrier elements or molds 35 which are slideable vertically in the turret 32 and which surround vertically movable plungers 36 (Fig. 1) carried on actuating rods 37 as disclosed in the above mentioned Nordquist patent. The vertically slideable measuring sleeves 35 receive a charge of the meat product B and carry the charge down into the advancing and vertically aligned container and then the sleeve is gradually withdrawn as the plunger 36 holds the product in the can and thus transfers the product from the sleeve to the can.

The charging of the sleeves 35 with the meat product B is effected by a manifold 41 which is disposed immediately below the path of travel of the filling heads 34, at a station located between the can feed-in star wheel 11 and the station where the can is lifted up against the bottom face 31 of the turret 32 by its lifter pad 16. The manifold 41 is formed as a substantially flat plate 42 (Figs. 1, 2 and 4) of arcuate shape to conform to the peripheral curvature of the turret face 31 and is provided with a smooth top face 43 which frictionally and abuttingly engages against the turret face 31. An upright guide ledge 44 on the plate 42 partially surrounds the periphery of the turret 32 and locates the plate radially relative to the turret.

The plate 42 is formed with an outwardly projecting hollow neck 46 which connects with a source of the meat product under pressure. The neck 46 is formed with a conduit 47 which communicates with an opening or port 48 in the plate 42. This opening 48 registers with the open bottom end of each measuring sleeve 35 as the sleeves slide across the manifold with the rotation of the turret 32 and thus introduces the meat product B under pressure successively into the moving measuring sleeves for subsequent transfer into the cans. This is disclosed in the above mentioned Nordquist patent.

In the instant invention the manifold 41 is loose and free of any connection with the filling machine except its connection with the source of meat product under pressure and when disconnected from this source may be readily removed from the machine for cleaning, repair or replacement. When in working place in the machine the manifold 41 loosely rests upon two convex faced support buttons or elements 52 (Figs. 1 and 3) which are disposed under the manifold plate 42 and which are located one on each side of the hollow manifold neck 46 as shown in Fig. 1, to provide for substantially point supports for self-alignment of the plate against the turret 32.

The support buttons 52 are formed on the free ends of a pair of independent overhanging horizontally disposed support arms 54 formed on the upper ends of a pair of depending guide rods 55 (see also Fig. 4) carried in vertically disposed guide bearings 56 formed on a bracket 57 secured to the frame 22 of the machine. The guide rods 55 are constrained against rotation in their bearings by set screws 59 (Fig. 4) which are threadedly secured in the side walls of the bearings and which project into elongated grooves 61 formed in the guide rods 55. Each of the arms 54 is also formed with a laterally projecting lug 63 (Figs. 1, 2 and 3) provided with a vertical groove or slideway 64 which accommodates a vertical tongue 65 on each of a pair of lugs 66 which depend from the manifold 41. These tongue connections permit of vertical movement between the manifold 41 and the support arms 54 while primarily holding the manifold against rotary movement with the turret 32.

At their lower ends, the guide rods 55 are connected to piston rods 68 (Fig. 4) having pistons 69 which operate within fluid pressure cylinders 71 attached to the machine frame 22 in any suitable manner. There is one cylinder 71 for each guide rod 55 so that the rods may be controlled separately. A fluid pressure medium such as compressed air, steam, water, oil or other suitable fluid is introduced into the cylinders 71 by way of an inlet pipe 72 secured in the cylinders near their lower ends. The pipes lead from a suitable source of the fluid medium. A normally open control valve 73 connected into the inlet pipe 72 is provided to control the admission of the fluid medium into the cylinders. A pressure regulator 74 is also provided in the line to control the pressure of the fluid medium.

Provision is made also for venting the cylinders 71 when required. For this purpose a vent pipe 75 is secured in the cylinders near their bottom ends. The vent pipe 75 is provided with a normally closed cutoff valve 76.

Hence when the control valves 73 are open and the vent valves 76 are closed, the fluid pressure medium fills the cylinders 71 and exerts a predetermined pressure against the pistons 69. This pressure on the pistons is transmitted through the guide rods 55 and support arms 54 and support buttons 52 to the manifold 41 and thus presses the plate 42 of the manifold upwardly, tight against the bottom face 31 of the rotating turret 32 and thus maintains a substantially airtight sliding engagement between the face 43 of the plate 42 and the face 31 of the turret 32 as the latter slides over the former. This pressure between the faces 43 and 31 also compensates for frictional wear between these faces. Hence during the introduction of the meat product from the manifold 41 to the filling heads 34 through the opening 48 in the manifold plate 42, the tight fitting engagement between the manifold plate and the bottom of the turret 32 prevents any escape of the meat product from between these parts.

When it is desired to remove the manifold for cleaning, the control valves 73 are closed and the vent valves 76 are opened. This dissipates the pressure within the cylinders 71 and thus permits the pistons 69 to fall down within the cylinders. With the pressure thus relieved the support arms 54 and buttons 52 fall away from the manifold plate 42 and thereby leave the manifold loose and free for easy removal, repair or cleaning and replacement.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a machine for filling meat products and the like into containers, the combination of a vertically disposed tubular carrier element having an opening in an end thereof for receiving and carrying a charge of the product to be filled into a container, means for advancing said carrier element along a predetermined path of travel to meet an aligned container, a manifold disposed alongside the path of travel of said end of the carrier element for introducing said product under pressure through said opening into the carrier element, said manifold having a loose and free mounting to facilitate quick removal for cleaning, a substantially point support for said manifold, and pressure means operable against said support to hold the manifold tightly against said end of the carrier element for the transfer of said product from said manifold to said carrier element without loss of said product.

2. In a machine for filling meat products and the like into containers, the combination of a vertically disposed tubular carrier element having an opening in an end thereof for receiving and carrying a charge of the product to be filled into a container, means for advancing said carrier element along a predetermined path of travel to meet an aligned container, a manifold disposed alongside said path of travel and in frictional engagement with said end of the carrier element for introducing said product under pressure through said opening into the carrier element, said manifold having a loose and free mounting to facilitate quick removal for cleaning, a pressure element engageable against said manifold, fluid pressure means operable against said pressure element to hold said manifold tightly against said end of the carrier element, and pressure regulating means for controlling the pressure of said fluid so that only sufficient pressure is applied to prevent leakage of the product thus minimizing friction and wear between the interengaged surfaces of said manifold and carrier element.

3. In a machine for filling meat products and the like into containers, the combination of a vertically disposed tubular carrier element having an opening in an end thereof for receiving and carrying a charge of the product to be filled into a container, means for advancing said carrier element along a predetermined path of travel to meet an aligned container, a manifold disposed alongside the path of travel of said end of the carrier element, said manifold having a loose and free mounting and being engageable along a surface thereof with said end of the carrier element, said surface of the manifold having a port therein through which said product is introduced under pressure into said end of the carrier element, a plurality of pressure elements disposed on opposite sides of said port and engageable against said manifold, and pressure means operable against said pressure elements to hold said manifold tightly against said end of the carrier element for the transfer of said product from said manifold to said carrier element without loss of said product.

4. In a machine for filling meat products and the like into containers, the combination of a vertically disposed tubular carrier element having an opening in its bottom end for receiving and carrying a charge of the product to be filled into a container, means for advancing said carrier element along a predetermined path of travel to meet an aligned container, a manifold disposed in said path of travel for introducing said product under pressure into the bottom end of said carrier element, said manifold having a loose and free mounting to facilitate quick removal for cleaning, a pressure element engageable against said manifold, fluid pressure means operable against said pressure element, and control means associated with said fluid pressure means for making said fluid pressure means effective against said pressure element to hold said manifold tightly against the bottom end of said carrier element for the transfer of said product from said manifold to said carrier element without loss of said product, said control means also adapted to make said fluid pressure means ineffective against said pressure element to facilitate removal of said manifold.

5. In a machine for filling meat products and the like into containers, the combination of a rotatable turret having a smooth face, a tubular carrier element mounted in said turret and having an opening in an end adjacent the smooth face of said turret for receiving and carrying a charge of the product to be filled into a container, means for rotating said turret, a freely and loosely mounted manifold having a smooth face in engagement with said smooth face of said turret, said manifold in its face having a port through which said product may be introduced under pressure into the opening in said carrier element, and pressure means including a pair of substantially point supports disposed on opposite sides of said port and operable against said manifold to hold its face in self-aligning contact against the face of said turret for the transfer of said product from said manifold to said carrier element without loss of said product.

6. In a machine for filling meat products and the like into containers, the combination of a rotatable turret having a smooth face, a tubular carrier element mounted in said turret and having an opening in an end adjacent the smooth face of said turret for receiving and carrying a charge of the product to be filled into a container, means for rotating said turret, a manifold having a smooth face in engagement with the smooth face of said turret, said manifold in its face having a port for introducing said product under pressure into the opening in said carrier element, a substantially point support for said manifold for self-alignment of said manifold face against said turret face, and pressure means operable against said point support to hold said manifold face tightly against the face of said turret for the transfer of said product from said manifold to said carrier element without loss of said product and to compensate for frictional wear between said faces.

References Cited in the file of this patent

UNITED STATES PATENTS

| 2,433,061 | Pearson et al. | Dec. 23, 1947 |
| 2,540,059 | Stirn et al. | Jan. 30, 1951 |